United States Patent
Ganguli et al.

(10) Patent No.: US 11,645,775 B1
(45) Date of Patent: May 9, 2023

(54) METHODS AND APPARATUS FOR DEPTH ESTIMATION ON A NON-FLAT ROAD WITH STEREO-ASSISTED MONOCULAR CAMERA IN A VEHICLE

(71) Applicant: PlusAI, Inc., Cupertino, CA (US)

(72) Inventors: Anurag Ganguli, Saratoga, CA (US); Zi Li, Cupertino, CA (US)

(73) Assignee: PlusAI, Inc., Cupertino, CA (US)

(*) Notice: Subject to any disclaimer, the term of this patent is extended or adjusted under 35 U.S.C. 154(b) by 0 days.

(21) Appl. No.: 17/847,965

(22) Filed: Jun. 23, 2022

(51) Int. Cl.
- *G06K 9/00* (2022.01)
- *G06T 7/593* (2017.01)
- *B60W 40/06* (2012.01)

(52) U.S. Cl.
CPC .......... *G06T 7/593* (2017.01); *B60W 40/06* (2013.01); *B60W 2420/42* (2013.01); *B60W 2552/20* (2020.02)

(58) Field of Classification Search
USPC .......................................................... 382/103
See application file for complete search history.

(56) References Cited

U.S. PATENT DOCUMENTS

| | | | |
|---|---|---|---|
| 7,046,822 B1* | 5/2006 | Knoeppel | G06T 7/174 348/E13.028 |
| 10,957,064 B2 | 3/2021 | Ganguli et al. | |
| 11,004,233 B1* | 5/2021 | Wang | G06T 7/70 |
| 2016/0307026 A1* | 10/2016 | Nishijima | G06F 18/25 |
| 2021/0042945 A1* | 2/2021 | Matsuo | G06T 7/50 |
| 2021/0174530 A1 | 6/2021 | Ganguli et al. | |
| 2022/0111839 A1* | 4/2022 | Jiang | G06T 7/593 |

OTHER PUBLICATIONS

Borkar, M., Patil, P., Pandey, P., Kolipaka, P., Komati, R., & Barhatte, A. Bolt-on Autonomous E-Vehicle System. Jun. 2021 (Year: 2021).*

U.S. Appl. No. 17/831,422, filed Jun. 2, 2022, inventor Mianwei Zhou.

* cited by examiner

*Primary Examiner* — Jonathan S Lee

(74) *Attorney, Agent, or Firm* — Sheppard Mullin Richter & Hampton LLP

(57) ABSTRACT

A non-transitory processor-readable medium stores code representing instructions to be executed by the processor. The code comprises code to cause the processor to receive a first image and a second image from a stereo camera pair disposed with a vehicle. The code causes the processor to detect, using a machine learning model, an object based on the first image, the object located within a pre-defined area within a vicinity of the vehicle. The code causes the processor to determine a distance between the object and the vehicle based on disparity between the first image and the second image. The code causes the processor to determine a longitudinal value of the vehicle based on the distance and a height of the vehicle. The code causes the processor to send an instruction to facilitate driving of the vehicle based on a road profile associated with the longitudinal value.

20 Claims, 10 Drawing Sheets

METHODS AND APPARATUS FOR DEPTH ESTIMATION ON A NON-FLAT ROAD WITH STEREO-ASSISTED MONOCULAR CAMERA IN A VEHICLE

FIELD

The present disclosure relates to stereo depth estimation on non-flat road in a vehicle (such as semi-autonomous vehicles or autonomous vehicles), and more specifically, to use stereo-assisted monocular camera for depth estimation.

BACKGROUND

Sensing and control technology can be used in a moving vehicle to make correct vehicle control decisions in dynamic situations. In such applications, the sensing and control technology performs, for example, depth estimation to estimate the distance to other objects such as vehicles, pedestrians, animals, obstacles, rain drops, snowflakes, haze particle, fog particle, etc., and/or to estimate the location, type, relative distance, size, shape, etc. of signs, lane markers, shoulder areas, roads, buildings, and faraway background such as sky, ocean, etc.

A known way to estimate depth involves the use of a LiDAR sensor. The cost of a LiDAR sensor, however, is high, and a LiDAR sensor is sensitive to weather conditions such as rain, snow, fog, haze, etc. and has a limited distance range for depth estimation. A less costly alternative to a LiDAR sensor for depth estimation involves the user of stereo cameras. Stereo depth estimation uses a stereo camera pair to estimate depth. Stereo vision is similar to three-dimensional (3D) perception in human vision and is based on the triangulation of rays from multiple viewpoints. Error of depth estimation from stereo cameras, however, grows quadratically with the increasing of the distance between the stereo cameras and the target. Thus, a need exists for a driving system (such as a semi-autonomous driving system or an autonomous driving system) to estimate depth of subjects in long distance with low errors.

SUMMARY

In some embodiments, an apparatus comprises a processor and a memory operatively coupled to the processor. The memory stores instructions to cause the processor to calculate a road profile in a pre-defined area within a vicinity of a vehicle based on map data of the pre-defined area. The road profile is associated with a road in the pre-defined area. The vehicle is associated with a first longitudinal value determined from the map data. The instructions cause the processor to receive a first image and a second image from a stereo camera pair disposed with the vehicle. The instructions cause the processor to detect, using a machine learning model, an object based on the first image, the object located within the pre-defined area. The instructions cause the processor to determine a distance between the object and the vehicle based on disparity between the first image and the second image. The instructions cause the processor to determine a second longitudinal value of the vehicle, based on the distance and a line of sight through a camera from the stereo camera pair and a contact point where the object contacts the road. The instructions cause the processor to send an instruction to facilitate driving of the vehicle based on the second longitudinal value of the vehicle and the road profile.

In some embodiments, a method comprises calculating a road profile in a pre-defined area within a vicinity of a vehicle based on map data of the pre-defined area. The method also comprises receiving a first image and a second image from a stereo camera pair disposed with the vehicle. The method comprises determining a distance from an object detected in the first image to the vehicle based on disparity between the first image and the second image. The method comprises determining a longitudinal value of the vehicle, based on the distance and a line of sight through a camera from the stereo camera pair and a contact point where the object contacts a road associated with the road profile. The method comprises sending a signal representing the road profile associated with the longitudinal value to facilitate driving of the vehicle.

In some embodiments, a non-transitory processor-readable medium stores code representing instructions to be executed by the processor. The code comprises code to cause the processor to receive a first image and a second image from a stereo camera pair disposed with a vehicle. The code causes the processor to detect, using a machine learning model, an object based on the first image, the object located within a pre-defined area within a vicinity of the vehicle. The code causes the processor to determine a distance between the object and the vehicle based on disparity between the first image and the second image. The code causes the processor to determine a longitudinal value of the vehicle based on the distance and a height of the vehicle. The code causes the processor to send an instruction to facilitate driving of the vehicle based on a road profile associated with the longitudinal value.

DETAILED DESCRIPTION

Figure 1:
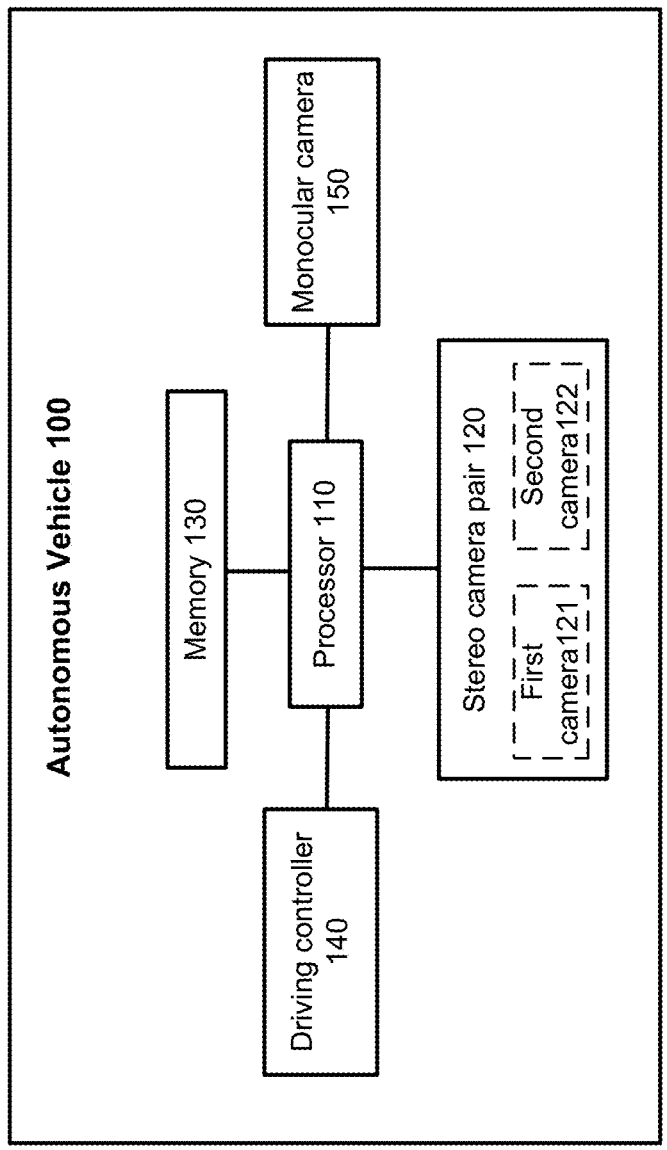
FIG. 1 is a block diagram of a vehicle that can estimate depth on a non-flat road with stereo-assisted monocular camera, according to an embodiment.

Depth estimation can be used for semi-autonomous driving or autonomous driving because depth is a parameter that can be used to perform perception, navigation and trajectory planning. Depth estimation can be performed, for example, relative to other vehicles, pedestrians, animals, obstacles, rain drops, snowflakes, haze particle, fog particle, etc., and/or can indicate the location, type, relative distance, size, shape, etc. of signs, lane markers, shoulder areas, roads, buildings, etc.

A known way to estimate depth involves the use of a LiDAR sensor. The cost of a LiDAR sensor, however, is high, and a LiDAR sensor is sensitive to weather conditions such as rain, snow, fog, haze, etc. and has a limited distance range for depth estimation. A less costly alternative to a LiDAR sensor for depth estimation involves the user of stereo cameras. Stereo depth estimation uses a stereo camera pair to estimate depth. Stereo vision is similar to three-dimensional (3D) perception in human vision and is based on the triangulation of rays from multiple viewpoints. Error of depth estimation from stereo cameras, however, grows quadratically with the increasing of the distance between the stereo cameras and the target. Moreover, depth estimation using stereo cameras is often very computationally expensive and thus are not applicable for real time usage. Thus, a need exists for driving system (such as a semi-autonomous driving system or an autonomous driving system) to estimate depth of subjects in long distance with low errors and less computational powers.

Monocular camera based depth estimation is another known approach for depth estimation and useful for depth estimation of faraway obstacles. Some known geometry-based monocular methods use pinhole camera projection relationship with a prior dimension assumption, which introduces large uncertainty depending on the actual size of the obstacle that is being estimated for depth. Another drawback of monocular camera based depth estimation is that the known monocular camera based depth estimation often has a flat ground assumption, which is inaccurate at far away obstacles. One or more embodiments described herein include systems and methods to improve depth estimation for vehicles by incorporating map information to improve the flat ground assumption, and to reduce the localization related error with the assistance of close-range stereo depth estimation results. Moreover, these systems and methods described herein do not assume a fixed template dimension prior to depth estimation, so these systems and methods should work well generic obstacles such as tires and pillars as with normal vehicles. Details of these systems and methods to accomplish fast and accurate depth estimation on a non-flat road with stereo-assisted monocular camera are described below.

A vehicle can operate in a manual driving mode, or a vehicle can operate in a manual driving mode during one time period and operate in a partially autonomous mode or a fully autonomous driving mode during a different time period. Autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Vehicles (e.g., autonomous vehicles) described herein can be configured to wirelessly communicate with one or more remote compute devices, during periods of time when wireless connectivity is available/possible, for a variety of purposes including, but not limited to: receiving third-party data, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensors to detect road moisture, wind and temperature data associated with one or more locations along a route of travel, earthquake detection instruments (e.g., seismometers), etc.), transmitting sensor data generated at the autonomous vehicle, transmitting alerts, etc.

FIG. 1 is a block diagram of a vehicle 100 that can estimate depth on a non-flat road with stereo-assisted monocular camera, according to an embodiment. The vehicle 100 can be for example any type of vehicle, such as a car, bus, or semitruck, and can be an autonomous vehicle as described above. As shown in FIG. 1, the vehicle 100 includes a processor 110, a stereo camera pair 120 operatively coupled to the processor 110, a memory 130 operatively coupled to the processor 110, a driving controller operatively coupled to the processor 110, and a monocular camera 150 operatively coupled to the processor 110.

The processor 110 can perform (or cause to be performed) any of the techniques discussed herein. The processor 110 can be or include, for example, a hardware-based integrated circuit (IC) or any other suitable processing device configured to run and/or execute a set of instructions or code. For example, the processor 110 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 110 can run any of the methods and/or portions of methods discussed herein. Although as shown in FIG. 1 the processor 110 is disposed with or within the vehicle 100, in alternative implementations, or the processor 110 can be remote from the vehicle 100.

The memory 130 can be, for example, a random-access memory (RAM), a memory buffer, a hard drive, a read-only memory (ROM), an erasable programmable read-only memory (EPROM), and/or the like. The memory 130 can store sensor data collected by the stereo camera pair 120, and any other data used by the processor 110 to perform the techniques discussed herein. In some instances, the memory 130 can store, for example, one or more software programs and/or code that can include instructions to cause the processor 110 to perform one or more processes, functions, and/or the like. In some implementations, the memory 130 can include extendible storage units that can be added and used incrementally. In some implementations, the memory 130 can be a portable memory (for example, a flash drive, a portable hard disk, and/or the like) that can be operatively coupled to the processor 110. In some instances, the memory 130 can be remotely operatively coupled with a compute device (not shown). For example, a remote database device can serve as a memory and be operatively coupled to the processor 110. The processor 110 can access data stored on the memory 130; for example, the processor 110 can access at least the data collected by the stereo camera pair 120 and stored in the memory 130.

The memory 130 can store one or more software algorithm(s) (not shown). The software algorithm(s) can be, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). After the processor 110 has received the image data collected by the stereo camera pair 120 and monocular camera 150, the processor 110 can process the data using software algorithm(s) to estimate depth based on the image data from the stereo camera pair 120 and the monocular camera 150.

The stereo camera pair 120 can include, for example, at least two stereo cameras such as first camera 121 and second camera 122, to collect image data associated with the vehicle 100. The stereo camera pair 120 can be used to observe and gather information that can be useful for performing the techniques discussed herein, such as information associated with an external environment of the vehicle 100 and/or the vehicle 100 itself. The stereo camera pair 120 can generate image data that includes, for example, representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle, etc., and/or the location, type, relative distance, size, shape, etc. of signs, lane markers, shoulder areas, roads, buildings, etc. Image data collected by the stereo camera pair 120 can include, for example, information representing a topography surrounding the vehicle 100, such as a road, sign, traffic light, walkway, building, body of water, etc. The stereo camera pair 120 is disposed on or with the autonomous vehicle 100. The first camera 121 and second camera 122 can be arranged as parallel or non-parallel (in other words, at an angle to each other) for generating images from different viewpoints.

The monocular camera 150 can be for example: a thermal imager camera, an infrared camera, a time of flight camera, an red/green/blue (RGB) camera, a two-dimensional (2-D) camera, a three-dimensional (3-D) camera, a 360-degree camera, etc. The monocular camera 150 can be used to observe and gather information that can be useful for performing the techniques discussed herein, such as information associated with an external environment of the vehicle 100 and/or the vehicle 100 itself. The monocular camera 150 can generate image data that includes for example representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle, etc., and/or the location, type, relative distance, size, shape, etc. of signs, lane markers, shoulder areas, roads, buildings, etc. Although as shown in FIG. 1, the monocular camera 150 is separate from the stereo camera pair 120, alternatively, the monocular camera 150 can be part of the stereo camera pair 120. For example, the monocular camera 150 can be one of the cameras in the stereo camera pair 120. Stated differently, the monocular camera 150 can be the first camera 121 or the second camera 122.

The driving controller 140 is communicatively coupled to the processor 110 and a plurality of operational systems (not shown) of the vehicle 100 through a communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can be a wireless network such as, for example, a Wi-Fi or wireless local area network ("WLAN"), a wireless wide area network ("WWAN"), and/or a cellular network. The communication network interconnects, for example, driving controller 140 with the processor 110 and other operational systems within the vehicle 100 and exchanges information between driving controller 140 and processor 110 and/or other operational systems for controlling one or more operations of the vehicle 100. The driving controller 140 can be part of the existing control system (not shown) of the vehicle 100 or can be a separate control unit that can be added (e.g., retrofitted) to the vehicle 100.

The vehicle 100 can be, for example, a medium truck, heavy truck, very heavy truck, a vehicle that is greater than 14,000 pounds, a vehicle that is greater than 26,000 pounds, a vehicle that is greater than 70,000 pounds, or a vehicle that is greater than 80,000 pounds. To ensure that larger vehicles have sufficient time/distance to perform appropriate actions, tamper event may be detected sufficiently in advance.

Figure 2:
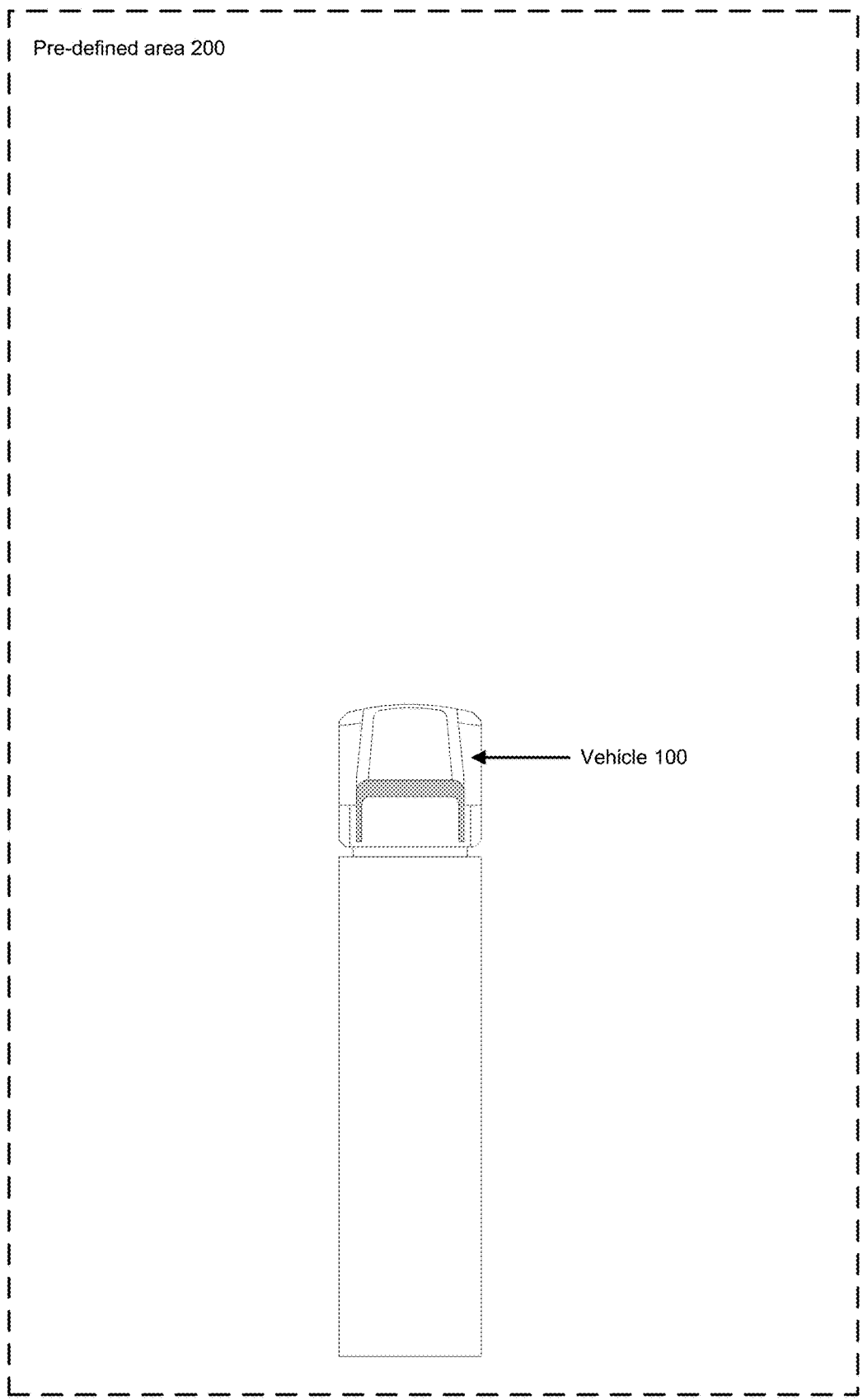
FIG. 2 is a diagram showing an example of a predefined area for the vehicle of FIG. 1.

FIG. 2 is a diagram showing an example of a predefined area for the vehicle of FIG. 1. As shown in FIG. 2, the vehicle 100, having onboard cameras including stereo camera pair 120 and monocular camera 150, has a predefined area 200 around the vehicle 100 for the stereo camera pair 120 and monocular camera 150 to collect data. Map data of the predetermined area 200 can be received by the vehicle 100 and camera data can be collected in the predetermined area 200 to determine depth of objects and location of the vehicle 100. The stereo camera pair 120 and monocular camera 150 collect data from the predetermined area 200, and depth of objects within the predetermined area 200 can be estimated based on the collected data. The objects can include for example a vehicle(s), a pedestrian(s), an animal(s), an obstacle(s), a tire splash, a splatter of rain, a splatter of snow/hail, a splatter of mud, a splatter of a bug, etc. Of course, other types of objects can be detected in the predetermined area 200 and the examples above are not meant to be exhaustive. A machine learning model can be used to detect different kind of objects within the predefined area 200 and depth can be estimated for the object.

Figure 3:
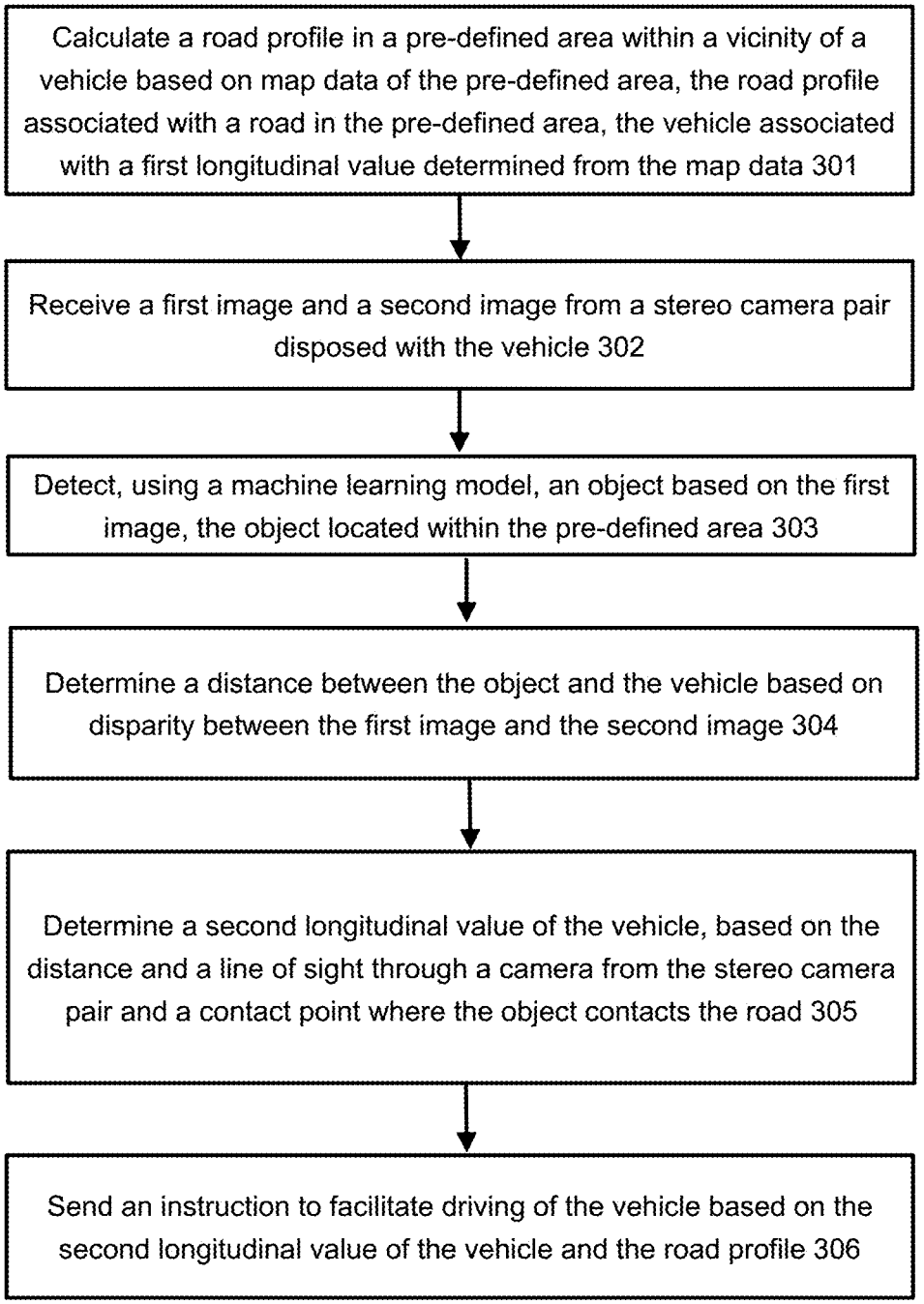
FIG. 3 is a flow diagram of a method for depth estimation on a non-flat road with stereo-assisted monocular camera, according to an embodiment.

FIG. 3 is a flow diagram of a method for depth estimation on a non-flat road with a stereo-assisted monocular camera, according to an embodiment. The method 300 of FIG. 3 can be implemented, for example, using the processor 110 of the vehicle 100 in FIG. 1. The method 300 can be performed, for example, while the vehicle is in motion.

Figure 9:
FIG. 9 is a diagram showing example map data, according to some embodiments.

As shown in FIG. 3, at 301, the method begins with calculating (by a processor such as processor 110 in FIG. 1) a road profile in a pre-defined area (e.g., pre-defined area 200 in FIG. 2) within a vicinity of a vehicle (e.g., vehicle 100 in FIGS. 1 and 2) based on map data of the pre-defined area. The road profile is associated with a road (not shown) in the pre-defined area. The vehicle (e.g., vehicle 100 in FIGS. 1 and 2) is associated with a first longitudinal value determined from the map data. The first longitudinal value represents the location of the vehicle (e.g., vehicle 100 in FIGS. 1 and 2). In some implementations, the map data includes coordinate values of a plurality of points in the pre-defined area. For each point from the plurality of points, the coordinate values includes at least one of a value in a first direction of a plane of the road, a value in a second direction of the plane of the road, a value in a third direction perpendicular to the plane of the road, or a pitch value. FIG. 9 is a diagram showing an example map data, according to some embodiments. The map data can be stored in the form of, for example, an .osm file, and include coordinate values of each point from the plurality of points in the format of a tag. Below is an example code of the map data:

```
<node id="10001" lat="123" lon="456" version="1">
    <tag k="reference_speed" v="0.0"/>
    <tag k="curvature" v="0.0"/>
    <tag k="heading" v="0.0"/>
    <tag k="pitch" v="0.00881910737733"/>
    <tag k="id" v="10001"/>
    <tag k="roll" v="-0.0469106074712"/>
</node>
```

Figure 10A:
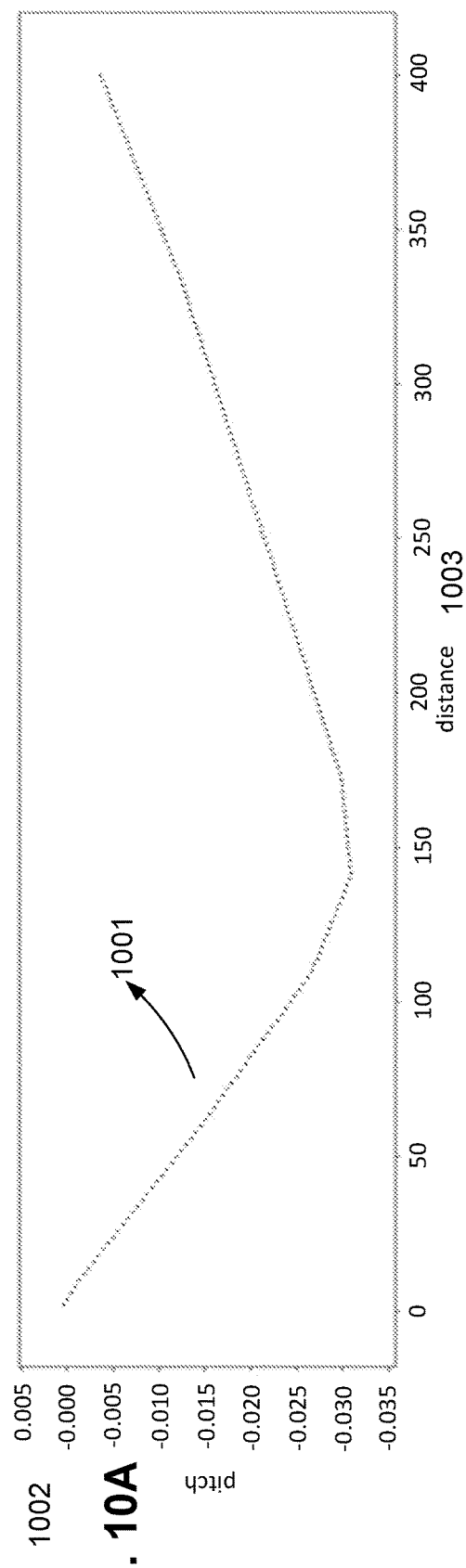
FIGS. 10A-10B are diagrams showing examples of road profiles, according to some embodiments.
Figure 10B:
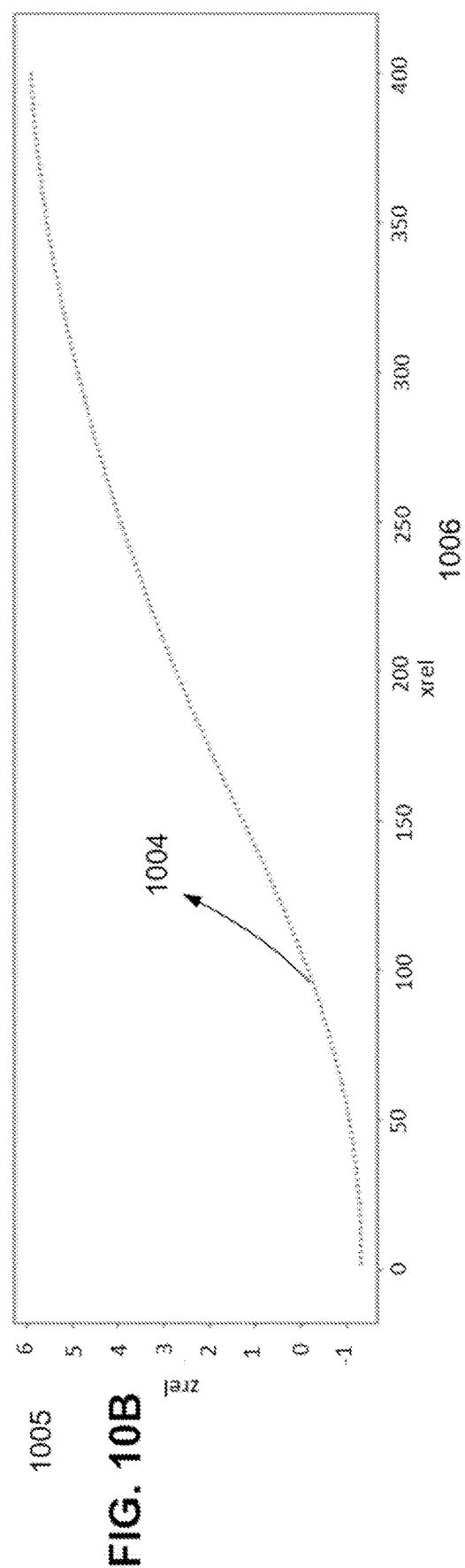

In the example code of the map data, a point with tag id 10001 has a latitude coordinate value 123, a longitudinal coordinate value 456, and a pitch value of 0.00881910737733. FIG. 9 is a diagram showing example map data with visualization of the plurality of points 901, according to some embodiments. As shown in FIG. 9, points 901 in the map data are visualized in an aerial image. Based on the map data, a road profile can be calculated. FIGS. 10A-10B are diagrams showing examples of road profiles, according to some embodiments. As shown in FIGS. 10A-10B, the road profile 1001 is calculated based on each point's pitch value 1002 and distance 1003 (alternatively, the road profile 1004 can be shown in a coordinate system with axis such as z 1005 and x 1006). Returning to FIG. 3, at 302, the method continues with receiving a first image and a second image from a stereo camera pair (e.g., stereo camera pair 120 in FIG. 1) disposed with the vehicle (e.g., vehicle 100 in FIGS. 1 and 2). The first image can be recorded by a first camera (e.g., first camera 121 in FIG. 1) from the stereo camera pair (e.g., stereo camera pair 120 in FIG. 1) and the second image can be recorded by a second camera (e.g., second camera 122 in FIG. 1) from the stereo camera pair (e.g., stereo camera pair 120 in FIG. 1). The first and second cameras (e.g., first camera 121 and second camera 122 in FIG. 1) of the stereo camera pair can be disposed on top of the vehicle (e.g., vehicle 100 in FIG. 1).

At 303, the method continues with detecting, using a machine learning model, an object based on the first image, the object located within the pre-defined area (e.g., pre-defined area 200 in FIG. 2). The object can include, for example one or more of vehicles, pedestrians, animals, obstacles, rain drops, snowflakes, haze particle, fog particle, etc., and/or signs, lane markers, shoulder areas, roads, grounds, buildings, poles, dividers, sky, walls, distant backgrounds, etc.

At 304, the method continues with determining a distance between the object and the vehicle (e.g., vehicle 100 in FIGS. 1 and 2) based on disparity between the first image and the second image. Determining a distance between the object and the vehicle based on disparity values is further discussed in connection with FIG. 8.

Figure 8:
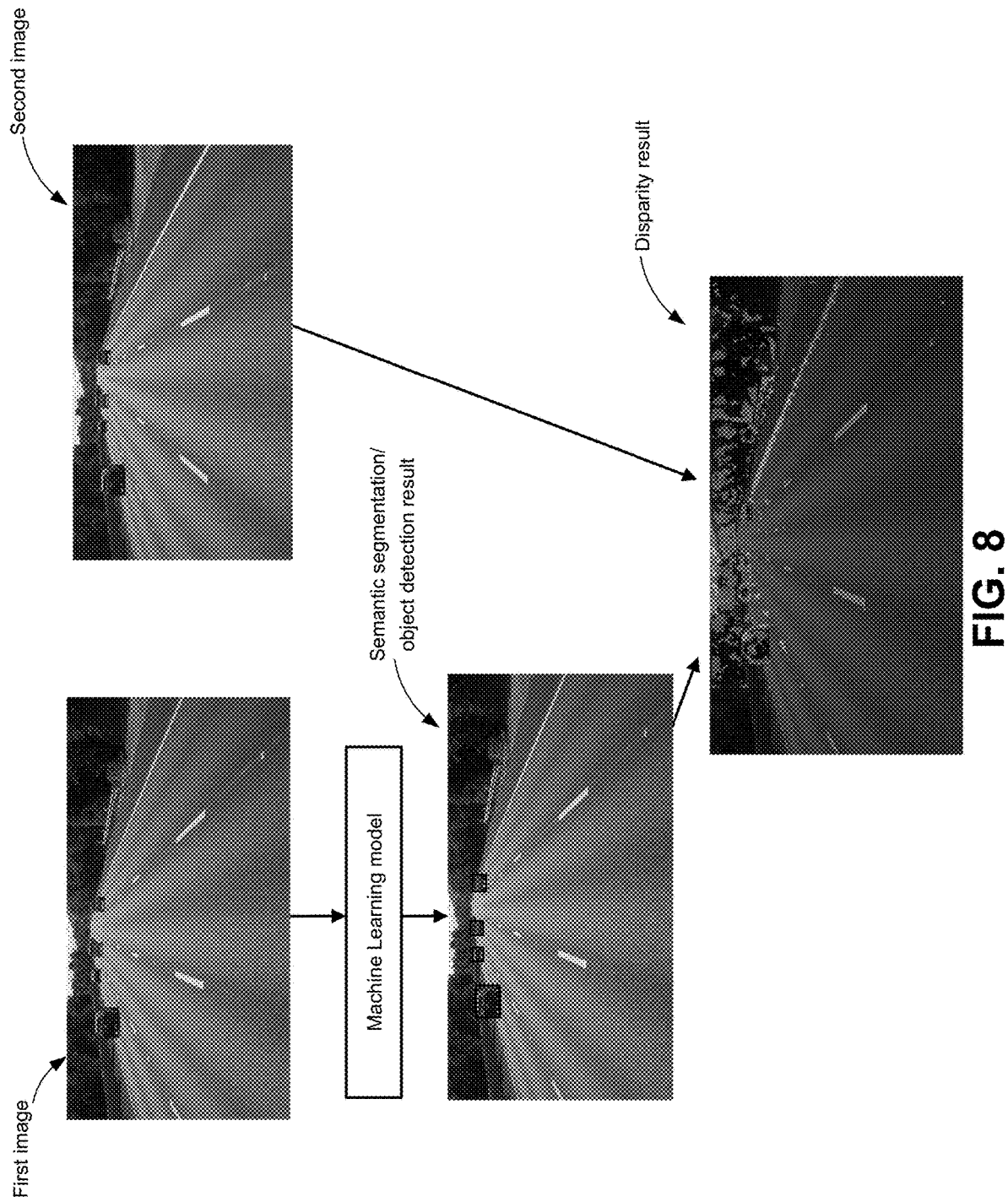
FIG. 8 is a diagram showing an example of depth estimation with stereo camera pairs, according an embodiment.

FIG. 8 is a diagram that includes example images used during the performance of a method for disparity calculation, according to an embodiment. Steps 302-304 in FIG. 3 are discussed in connection with FIG. 8. As shown in FIG. 8, a first image from a first camera (e.g., first camera 121 in FIG. 1) from a stereo camera pair (e.g., stereo camera pair 120 in FIG. 1) and a second image from a second camera (e.g., second camera 122 in FIG. 1) from the stereo camera pair (e.g., stereo camera pair 120 in FIG. 1) can be received at a processor (e.g., processor 110 in FIG. 1). A machine learning model is used by the processor to determine an object in the first image. An object(s) can include, for example vehicles, pedestrians, animals, obstacles, rain drops, snowflakes, haze particle, fog particle, etc., and/or can indicate location, type, relative distance, size, shape, etc. of signs, lane markers, shoulder areas, roads, grounds, buildings, poles, dividers, sky, walls, distant backgrounds, etc. An object type from a plurality of object types for each object from the first set of objects is determined by the processor (e.g., using semantic segmentation/object detection) and represented in FIG. 8 by the image labeled "Semantic segmentation/objection detection result". The object type can include, for example, at least one of a vehicle type, a ground type, a wall type, a pole type, a pedestrian type, a divider type, a distant background type, a traffic sign type, a tree type, a building type, an animal type, a speed bump type, etc. A second set of objects in the second image associated with the first plurality of objects is searched by the processor. A set of disparity values between the first image and the second image is calculated based on (1) an object from the first set of objects, (2) an object from the second set of objects and associated with the object from the first set of objects, and (3) an object type of the object from the first set of objects. The set of disparity values is represented in FIG. 8 by the image labeled "Disparity result". The set of disparity values can be visualized by different colors or shades of color. Distance between the object and the vehicle (e.g., vehicle 100 in FIGS. 1 and 2) can be calculated based on the disparity result from the stereo camera pair (e.g., stereo camera pair 120 in FIG. 1). With the disparity values, depth information (e.g., a depth map as shown in FIG. 8) can be calculated. Additional information related to depth calculation based on stereo camera pair is provided, for example, in each of U.S. Patent Application Publication No. 2021/0174530 and U.S. Pat. No. 10,957,064, and U.S. Patent Application No. 17/831,422, all of which are incorporated herein by reference in their entireties.

Returning to FIG. 3, at 305, the method continues with determining a second longitudinal value of the vehicle (e.g., vehicle 100 in FIG. 1 and FIG. 2), based on the distance and a line of sight through a camera (e.g., first camera 121 or second camera 122 in FIG. 1) from the stereo camera pair (e.g., stereo camera pair 120 in FIG. 1) and a contact point where the object contacts the road. Determining a second longitudinal value of the vehicle is further discussed in connection with FIG. 6.

Figure 6:
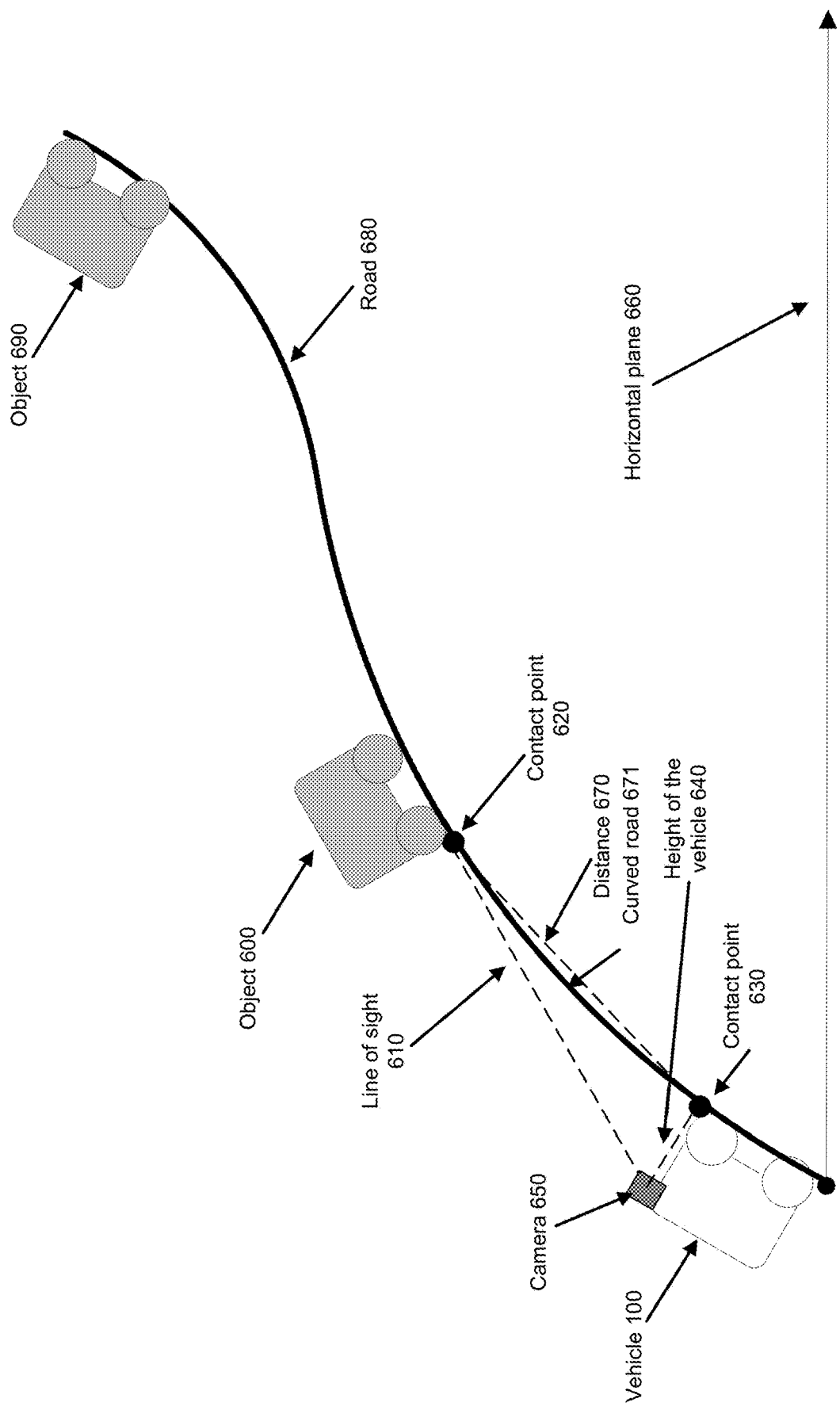
FIG. 6 is a diagram showing an example of a vehicle that can estimate depth on a non-flat road with stereo-assisted monocular camera, according to an embodiment.

FIG. 6 is a diagram showing an example of longitudinal value determination of a vehicle on a non-flat road with stereo-assisted monocular camera, according to an embodiment. As shown in FIG. 6, the vehicle 100 is traveling on a road 680. An object 600 is traveling in front of the vehicle

100. The distance between the object 600 and the vehicle 100 is represented as distance 670. The camera is represented as camera 650. The camera 650 can be a monocular camera (e.g., monocular camera in FIG. 1) that is separated from the stereo camera pair (e.g., stereo camera pair 120 in FIG. 1) or can be part of the stereo camera (e.g., first camera 121 or second camera 122 in FIG. 1). The camera 650 here is disposed on top of the vehicle 100. The contact point is represented as contact point 620. The contact point 620 is the point where the object 600 contacts the road 680. A line of sight 610 represents a straight line between the camera 650 and the contact point 620. A second longitudinal value of the vehicle 100 is determined based on the distance 670 and the line of sight 610. The second longitudinal value represents the location of the vehicle 100.

In some implementations, as shown in FIG. 6, the contact point 620 is a first contact point where the object 600 contacts the road 680. A second contact point as represented by contact point 630 is defined as the contact point where the vehicle 100 contacts the road 680. The second longitudinal value of the vehicle 100 is determined based on the coordinate values of the first contact point 620 and the second contact point 630.

Figure 7:
FIG. 7 is a diagram showing an example of bonding boxes on objects, according to another embodiment.

In some implementations, a bounding box representing the object is identified. FIG. 7 is a diagram showing an example of bonding boxes on objects, according to an embodiment. As shown in FIG. 7, bounding boxes representing vehicle objects such as object 710 and object 720 can be identified in the image detected by the camera (e.g., camera 650 in FIG. 6). Each vehicle object such as object 710 and object 720 has its own bounding box in the image. The contact point (where the object contacts the road, e.g., contact point 620 in FIG. 6) is defined based on a bottom edge of the bounding box as shown in FIG. 7 such as bottom edge 711 of bounding box of object 710. The coordinates of the contact point is determined in an image coordinate system. The second longitudinal value of the vehicle (e.g., vehicle 100 in FIG. 1 and FIG. 6) is determined based on the coordinates of the contact point. In some implementations, the coordinates of the contact point in the image coordinate system is converted to coordinates of the contact point in a global coordinate system by the processor (e.g., processor 110 in FIG. 1). And the second longitudinal value of the vehicle (e.g., vehicle 100 in FIGS. 1, 2 and 6) is determined based on the coordinates of the contact point in the global coordinate system.

In some implementations, the processor (e.g., processor 110 in FIG. 1) detects a three-dimensional structure of the object (e.g., object 600 in FIG. 6, object 710 and object 720 in FIG. 7). The processor (e.g., processor 110 in FIG. 1) can determine, in an image coordinate system, coordinates of the contact point (e.g., contact point 620 in FIG. 6) where the object contacts the road based on the three-dimensional structure of the object. In some implementations, the processor (e.g., processor 110 in FIG. 1) converts the coordinates of the contact point (e.g., contact point 620 in FIG. 6) in the image coordinate system to coordinates of the contact point in a global coordinate system. The processor (e.g., processor 110 in FIG. 1) determines the second longitudinal value of the vehicle based on the coordinates of the contact point in the global coordinate system.

In some implementations, as shown in FIG. 6, the contact point 620 is a first contact point. The processor (e.g., processor 110 in FIG. 1) determines the second longitudinal value based on a triangulation of the line of sight 610, a line segment 670 between the first contact point and a second contact point 630 where the vehicle 100 contacts the road 680, and a line segment 640 of a height of the vehicle.

In some implementations, the road profile is a first road profile calculated from the map data of the pre-defined area (e.g., step 301 in FIG. 3). As shown in FIG. 6, based on the distance 670 and the line of sight 610, a second road profile can be calculated by the processor (e.g., processor 110 in FIG. 1). The processor (e.g., processor 110 in FIG. 1) determines the second longitudinal value of the vehicle (e.g., vehicle 100 in FIG. 1, FIG. 2 and FIG. 6) by adjusting the first longitudinal value of the vehicle to reduce a difference between the first road profile and the second road profile (e.g., the profile of the curved road 671 between contact point 630 and contact point 620) calculated based on the distance (e.g., distance 670 in FIG. 6) and the line of sight (e.g., line of sight 610 in FIG. 6). In other words, the processor can adjust the first longitudinal value of the vehicle such that the second road profile (calculated based on stereo images) matches at least a section of the first road profile (calculated from the map data) within a pre-determined criteria. Alternatively, the processor (e.g., processor 110 in FIG. 1) can determine the second longitudinal value of the vehicle (e.g., vehicle 100 in FIGS. 1, 2 and 6) by adjusting the first longitudinal value of the vehicle to reduce, using an optimization method, a difference between the first road profile and the second road profile calculated based on the distance (e.g., distance 670 in FIG. 6) and the line of sight (e.g., line of sight 610 in FIG. 6). The optimization methods can be any suitable optimization method that is suitable for reducing the difference between the first longitudinal value and the second longitudinal value. The optimization methods can include, for example, deterministic methods such as branch and cut constraint programming, dynamic programing, optimized path, and stochastic methods such as heuristic algorithms (metaheuristics and problem-based heuristics) and stochastic algorithms etc.

In some implementations, the machine learning model is a first machine learning model. In some implementations, the first machine learning model to detect object(s) based on a stereo image can include deep learning approaches (e.g., convolutional neural networks), or classic computer vision techniques (e.g., Haar Cascade). The road profile is a first road profile. As shown in FIG. 6, based on the distance 670 and the line of sight 610, a second road profile (e.g., the profile of the curved road 671 between contact point 630 and contact point 620) can be calculated by the processor (e.g., processor 110 in FIG. 1). The processor (e.g., processor 110 in FIG. 1) determines the second longitudinal value of the vehicle (e.g., vehicle 100 in FIGS. 1, 2 and 6) by adjusting the first longitudinal value of the vehicle to reduce, using a second machine learning model, a difference between the first road profile and the second road profile calculated based on the distance (e.g., distance 670 in FIG. 6) and the line of sight (e.g., line of sight 610 in FIG. 6). The first and second machine learning model each can be any kind of machine learning model that is suitable to perform the functions to reduce the difference between the first and the second road profiles to determine the second longitudinal values. The first and second machine learning model each can be, for example, supervised machine learning model, semi-supervised machine learning model, unsupervised machine learning model, reinforcement machine learning model, and a deep learning model. The first and second machine learning model each can include: convolutional neural networks, long short term memory networks, recurrent neural networks, generative adversarial networks, radial basis function networks, multilayer perceptrons, self organizing maps, deep belief networks, Restricted Boltzmann machines, autoencoders and Haar Cascade, and/or the like.

In some implementations, as shown in FIG. 7, the object is a first object 710. The processor (e.g., processor 110 in FIG. 1) can detect a second object (e.g., object 690 in FIG. 6) such as object 720 using a sensor (e.g., camera 650 in FIG. 6) disposed with the vehicle (e.g., vehicle 100 in FIGS. 1, 2, and 6). The processor can determine, using the road profile associated with the second longitudinal value of the vehicle and a line of sight through the sensor (similar to line of sight 610 in FIG. 6) and a contact point (similar to contact point 620 in FIG. 6) where the second object 720 (similar to object 690 in FIG. 6) contacts the road, a distance (similar to distance 670 in FIG. 6) between the second object 720 and the vehicle. In some implementations, the second object 720 is located further away from the vehicle than the first object 710. The processor determines the distance between the second object 720 and the vehicle does not include using stereo depth estimation via the stereo camera pair (e.g., stereo camera pair 120 in FIG. 1). As mentioned before, error of depth estimation from stereo cameras grows quadratically with the increasing of the distance between the stereo cameras and the object. Moreover, depth estimation using stereo cameras is often very computationally expensive and thus are not applicable for real time usage. Thus depth estimation for objects in long distance without using stereo depth estimation via the stereo camera pair results in low errors and less computational powers. In some implementations, object in long distance can mean object in any distance that is more than the distance for stereo cameras to get accurate result, etc. In some implementations, depth estimation for objects in long distance can be accomplished in real time such as within minutes, seconds, milliseconds, microseconds etc.

Returning to FIG. 3, at 306, the method continues with sending an instruction to facilitate driving of the vehicle (e.g., vehicle 100 in FIGS. 1, 2, and 6) based on the second longitudinal value of the vehicle and the road profile. The instruction can be sent from the processor (e.g., processor 110 in FIG. 1) to a driving controller (e.g., driving controller 140 in FIG. 1) to facilitate driving of the vehicle. For example, if the processor (e.g., processor 110 in FIG. 1) determines that the distance between the object (e.g., the second object that is located further away from the vehicle than the first object) and the vehicle is too close, the processor can send instruction to instruct the vehicle to slow down and keep a safe distance. Stated another way, embodiments described herein include a method of using a distance estimated between the vehicle and a closely-located object based on stereo image pairs to find a more accurate position of the vehicle relative to the non-flat road, and thus resulting in an more accurate estimation of a distance between the vehicle and an object located further away to facilitate the autonomous driving of the vehicle.

Figure 4:
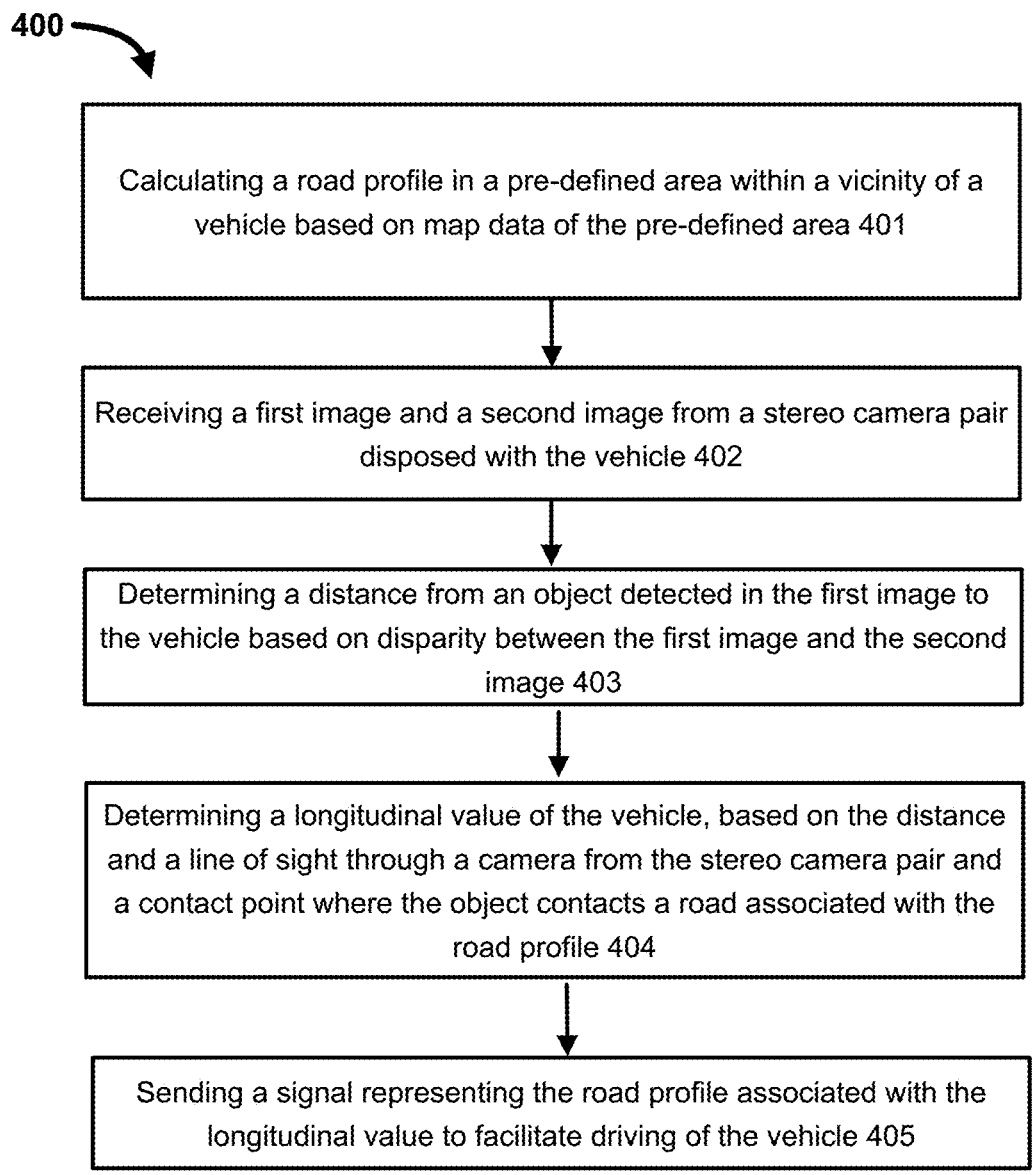
FIG. 4 is a flow diagram of a method for depth estimation on a non-flat road with stereo-assisted monocular camera, according to another embodiment.

FIG. 4 is a flow diagram of a method for depth estimation on a non-flat road with stereo-assisted monocular camera, according to another embodiment. The method 400 of FIG. 4 can be implemented, for example, using the processor 110 of the vehicle 100 in FIG. 1. The method 400 can be performed, for example, while the vehicle is in motion.

As shown in FIG. 4, at 401, the method begins with calculating (by a processor such as processor 110 in FIG. 1) a road profile in a pre-defined area (e.g., pre-defined area 200 in FIG. 2) within a vicinity of a vehicle (e.g., vehicle 100 in FIGS. 1 and 2) based on map data of the pre-defined area. FIG. 9 is a diagram showing an example map data, according to some embodiments. The map data can be stored in the form of, for example, an .osm file, and include coordinate values of each point from the plurality of points in the format of a tag. Below is an example code of the map data:

```
<node id="10001" lat="123" lon="456" version="1">
    <tag k="reference_speed" v="0.0"/>
    <tag k="curvature" v="0.0"/>
    <tag k="heading" v="0.0"/>
    <tag k="pitch" v="0.00881910737733"/>
<tag k="id" v="10001"/>
<tag k="roll" v="-0.0469106074712"/>
</node>
```

In the example code of the map data, a point with tag id 10001 has a latitude coordinate value 123, a longitudinal coordinate value 456, and a pitch value of 0.00881910737733. FIG. 9 is a diagram showing example map data with visualization of the plurality of points 901, according to some embodiments. As shown in FIG. 9, points 901 in the map data are visualized in an aerial image. Based on the map data, a road profile can be calculated. FIGS. 10A-10B are diagrams showing examples of road profiles, according to some embodiments. As shown in FIGS. 10A-10B, the road profile 1001 is calculated based on each point's pitch value 1002 and distance 1003 (alternatively, the road profile 1004 can be shown in a coordinate system with axis such as z 1005 and x 1006).

Returning to FIG. 4, at 402, the method continues with receiving a first image and a second image from a stereo camera pair (e.g., stereo camera pair 120 in FIG. 1) disposed with the vehicle (e.g., vehicle 100 in FIGS. 1 and 2). The first image can be recorded by a first camera (e.g., first camera 121 in FIG. 1) from the stereo camera pair (e.g., stereo camera pair 120 in FIG. 1) and the second image can be recorded by a second camera (e.g., second camera 122 in FIG. 1) from the stereo camera pair (e.g., stereo camera pair 120 in FIG. 1). The first and second cameras (e.g., first camera 121 and second camera 122 in FIG. 1) of the stereo camera pair can be for example disposed on top of the vehicle (e.g., vehicle 100 in FIG. 1).

At 403, the method continues with determining a distance from an object detected in the first image to the vehicle (e.g., vehicle 100 in FIG. 1) based on disparity between the first image and the second image. The object can include, for example, one or more of vehicles, pedestrians, animals, obstacles, rain drops, snowflakes, haze particle, fog particle, etc., and/or signs, lane markers, shoulder areas, roads, grounds, buildings, poles, dividers, sky, walls, distant backgrounds, etc. Determining a distance between the object and the vehicle based on disparity values is further discussed for example in connection with FIG. 8 as discussed above.

At 404, the method continues with determining a longitudinal value of the vehicle (e.g., vehicle 100 in FIGS. 1 and 2), based on the distance and a line of sight through a camera (e.g., first camera 121 or second camera 122 in FIG. 1) from the stereo camera pair (e.g., stereo camera pair 120 in FIG. 1) and a contact point where the object contacts the road. Determining a longitudinal value of the vehicle is further discussed for example in connection with FIG. 6.

As mentioned above, FIG. 6 is a diagram showing an example of longitudinal value determination of a vehicle on a non-flat road with stereo-assisted monocular camera, according to an embodiment. As shown in FIG. 6, the vehicle 100 is traveling on a road 680. An object 600 is traveling in front of the vehicle 100. The distance between the object 600 and the vehicle 100 is represented as distance 670. The camera is represented as camera 650. The camera 650 can be a monocular camera (e.g., monocular camera in FIG. 1) that is separated from the stereo camera pair (e.g., stereo camera pair 120 in FIG. 1) or can be part of the stereo camera (e.g., first camera 121 or second camera 122 in FIG. 1). The camera 650 is disposed on top of the vehicle 100. The contact point is represented as contact point 620. The contact point 620 is the point where the object 600 contacts the road 680. A line of sight 610 represents a straight line between the camera 650 and the contact point 620. A longitudinal value of the vehicle 100 is determined based on the distance 670 and the line of sight 610. The longitudinal value represents the location of the vehicle 100.

At 405, the method continues with sending a signal representing the road profile associated with the longitudinal value to facilitate driving of the vehicle (e.g., vehicle 100 in FIGS. 1, 2 and 6). The instruction can be sent from a processor (e.g., processor 110 in FIG. 1) to a driving controller (e.g., driving controller 140 in FIG. 1) of the vehicle to facilitate driving of the vehicle.

In some implementations, as shown in FIG. 7, the object is a first object 710. A second object such as object 720 can be detected using a sensor (e.g., camera 650 in FIG. 6) disposed with the vehicle (e.g., vehicle 100 in FIGS. 1, 2, and 6). A distance (similar to distance 670 in FIG. 6) between the second object 720 (similar to object 690 in FIG. 6) and the vehicle (e.g., vehicle 100 in FIGS. 1, 2, and 6) is determined, using the road profile associated with the longitudinal value of the vehicle, a line of sight through the sensor (similarly to line of sight 610 in FIG. 6) and a contact point (similarly to contact point 620 in FIG. 6) where the second object 720 (similar to object 690 in FIG. 6) contacts the road.

In some implementations, a bounding box representing the object is identified. FIG. 7 is a diagram showing an example of bonding boxes on objects, according to an embodiment. As shown in FIG. 7, bounding boxes representing vehicle objects such as object 710 and object 720 can be identified in the image detected by the camera (e.g., camera 650 in FIG. 6). Each vehicle object such as object 710 and object 720 has its own bounding box in the image. The contact point (where the object contacts the road, e.g., contact point 620 in FIG. 6) is defined based on a bottom edge of the bounding box as shown in FIG. 7 such as bottom edge 711 of bounding box of object 710. The coordinates of the contact point is determined in an image coordinate system. The longitudinal value of the vehicle (e.g., vehicle 100 in FIGS. 1 and 6) is determined based on the coordinates of the contact point. In some implementations, the coordinates of the contact point in the image coordinate system is converted to coordinates of the contact point in a global coordinate system. And the longitudinal value is determine based on the coordinates of the contact point in the global coordinate system.

In some implementations, as shown in FIG. 6, the contact point 620 is a first contact point. The longitudinal value is determined based on a triangulation of the line of sight 610, a line segment 670 between the first contact point and a second contact point 630 where the vehicle 100 contacts the road 680, and a line segment 640 of a height of the vehicle.

In some implementations, the road profile is a first road profile. The longitudinal value of the vehicle is a first longitudinal value. A second longitudinal value of the vehicle is received from the map data. As shown in FIG. 6, based on the distance 670 and the line of sight 610, a second road profile can be calculated. The first longitudinal value of the vehicle (e.g., vehicle 100 in FIGS. 1, 2 and 6) is determined by adjusting the second longitudinal value of the vehicle to reduce a difference between the first road profile and the second road profile calculated based on the distance (e.g., distance 670 in FIG. 6) and the line of sight (e.g., line of sight 610 in FIG. 6).

Figure 5:
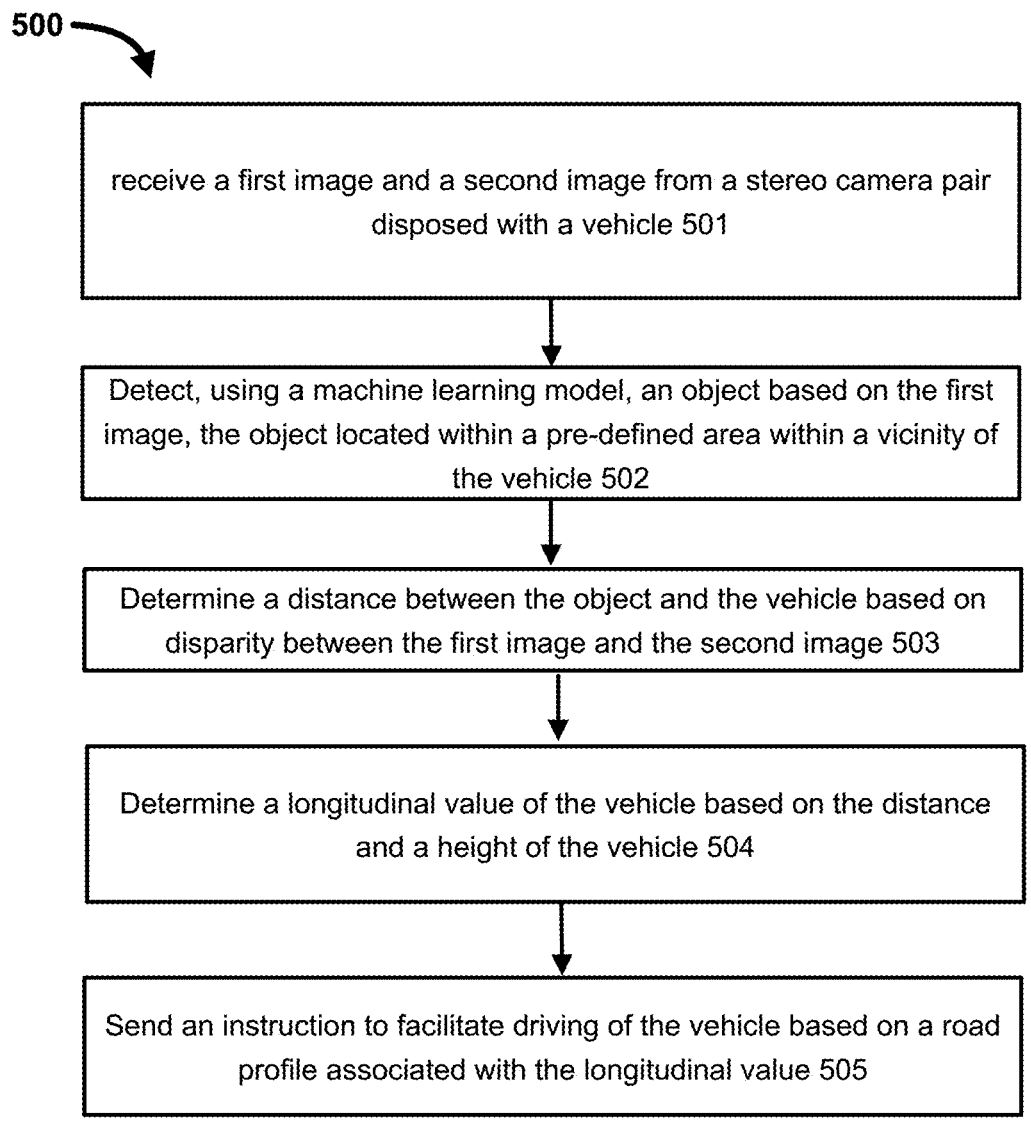
FIG. 5 is a flow diagram of a method for depth estimation on a non-flat road with stereo-assisted monocular camera, according to yet another embodiment.

FIG. 5 is a flow diagram of a method for depth estimation on a non-flat road with stereo-assisted monocular camera, according to yet another embodiment.

As shown in FIG. 5, at 501, the method begins with receiving a first image and a second image from a stereo camera pair (e.g., stereo camera pair 120 in FIG. 1) disposed with a vehicle (e.g., vehicle 100 in FIGS. 1 and 2). The first image can be recorded by a first camera (e.g., first camera 121 in FIG. 1) from the stereo camera pair and the second image can be recorded by a second camera (e.g., second camera 122 in FIG. 1) from the stereo camera pair. The first and second cameras of the stereo camera pair can be disposed on top of the vehicle (e.g., vehicle 100 in FIG. 1).

At 502, the method continues with detecting, using a machine learning model, an object based on the first image, the object located within the pre-defined area (e.g., pre-defined area 200 in FIG. 2). The object can include, for example one or more of vehicles, pedestrians, animals, obstacles, rain drops, snowflakes, haze particle, fog particle, etc., and/or signs, lane markers, shoulder areas, roads, grounds, buildings, poles, dividers, sky, walls, distant backgrounds, etc. The machine learning model can be any kind of machine learning model that is suitable to perform the functions to detect object on the first image. The machine learning model can be, for example, supervised machine learning model, semi-supervised machine learning model, unsupervised machine learning model, reinforcement machine learning model, and deep learning. The machine learning algorithms used to train and build the machine learning model can include: linear regression, support vector machine, naive bayes, logistic regression, k-nearest neighbors, decision trees, random forest, gradient boosted decision trees, k-means clustering, hierarchical clustering, principal component analysis, neural network etc.

At 503, the method continues with determining a distance between the object and the vehicle (e.g., vehicle 100 in FIGS. 1 and 2) based on disparity between the first image and the second image. Determining a distance between the object and the vehicle based on disparity values is further discussed in connection with FIG. 8 as discussed above.

At 504, the method continues with determining a longitudinal value of the vehicle based on the distance and a height of the vehicle (e.g., vehicle 100 in FIG. 1 and FIG. 2). Determining a longitudinal value of the vehicle is further discussed in connection with FIG. 6.

As mentioned above, FIG. 6 is a diagram showing an example of longitudinal value determination of a vehicle on a non-flat road with stereo-assisted monocular camera, according to an embodiment. As shown in FIG. 6, the vehicle 100 is traveling on a road 680. An object 600 is traveling in front of the vehicle 100. The distance between the object 600 and the vehicle 100 is represented as distance 670. The height of the vehicle is represented as height of the vehicle 640. A camera is represented as camera 650. The camera 650 can be a monocular camera (e.g., monocular camera 150 in FIG. 1) that is separated from the stereo camera pair (e.g., stereo camera pair 120 in FIG. 1) or can be part of the stereo camera (e.g., first camera 121 or second camera 122 in FIG. 1). The camera 650 is disposed on top of the vehicle 100. A longitudinal value of the vehicle 100 is determined based on the distance 670 and the height of the vehicle 640. The longitudinal value represents the location of the vehicle 100.

At 505, the method continues with sending an instruction to facilitate driving of the vehicle based on a road profile associated with the longitudinal value. The instruction can be sent from a processor (e.g., processor 110 in FIG. 1) to a driving controller (e.g., driving controller 140 in FIG. 1) of the vehicle to facilitate driving of the vehicle. For example, if the processor (e.g., processor 110 in FIG. 1) determines that the distance between the object and the vehicle is too close, the processor can send instruction to instruct the vehicle to slow down and keep a safe distance. FIGS. 10A-10B are diagrams showing examples of road profiles, according to some embodiments. As shown in FIGS. 10A-10B, the road profile 1001 is calculated based on each point's pitch value 1002 and distance 1003 (alternatively, the road profile 1004 can be shown in a coordinate system with axis such as z 1005 and x 1006). In some embodiments, an apparatus, comprises a processor and a memory operatively coupled to the processor. The memory stores instructions to be executed by the processor. The code comprises code to cause the processor to calculate a road profile in a pre-defined area within a vicinity of a vehicle based on map data of the pre-defined area. The road profile is associated with a road in the pre-defined area. The vehicle is associated with a first longitudinal value determined from the map data. The code causes the processor to receive a first image and a second image from a stereo camera pair disposed with the vehicle. The code causes the processor to detect, using a machine learning model, an object based on the first image, the object located within the pre-defined area. The code causes the processor to determine a distance between the object and the vehicle based on disparity between the first image and the second image. The code causes the processor to determine a second longitudinal value of the vehicle, based on the distance and a line of sight through a camera from the stereo camera pair and a contact point where the object contacts the road. The code causes the processor to send an instruction to facilitate driving of the vehicle based on the second longitudinal value of the vehicle and the road profile.

In some embodiments, the map data includes coordinate values of a plurality of points in the pre-defined area. For each point from the plurality of points, the coordinate values includes at least one of a value in a first direction of a plane of the road, a value in a second direction of the plane of the road, a value in a third direction perpendicular to the plane of the road, or a pitch value.

In some embodiments, the contact point is a first contact point. The code further comprises code to cause the processor to determine the second longitudinal value of the vehicle based on the coordinate values of the first contact point where the object contacts the road and the coordinate values of a second contact point where the vehicle contacts the road.

In some embodiments, the code further comprises code to cause the processor to: identify a bounding box representing the object, and determine, in an image coordinate system, coordinates of the contact point where the object contacts the road based on a bottom edge of the bounding box. The code to cause the processor to determine the second longitudinal value of the vehicle includes code to cause the processor to determine based on the coordinates of the contact point.

In some embodiments, the code further comprises code to cause the processor to convert the coordinates of the contact point in the image coordinate system to coordinates of the contact point in a global coordinate system. The code causes the processor to determine the second longitudinal value of the vehicle is based on the coordinates of the contact point in the global coordinate system.

In some embodiments, the code to cause the processor to detect the object includes code to cause the processor to detect a three-dimensional structure of the object. The code further comprises code to cause the processor to determine, in an image coordinate system, coordinates of the contact point where the object contacts the road based on the three-dimensional structure of the object.

In some embodiments, the code further comprises code to cause the processor to convert the coordinates of the contact point in the image coordinate system to coordinates of the contact point in a global coordinate system. The code causes the processor to determine the second longitudinal value of the vehicle based on the coordinates of the contact point in the global coordinate system.

In some embodiments, the contact point is a first contact point. The code to cause the processor to determine the second longitudinal value includes code to cause the processor to determine the second longitudinal value based on a triangulation of the line of sight, a line segment between the first contact point and a second contact point where the vehicle contacts the road, and a line segment of a height of the vehicle.

In some embodiments, the road profile is a first road profile. The code further comprises code to cause the processor to determine the second longitudinal value of the vehicle by adjusting the first longitudinal value of the vehicle to reduce a difference between the first road profile and a second road profile calculated based on the distance and the line of sight.

In some embodiments, the road profile is a first road profile. The code further comprises code to cause the processor to determine the second longitudinal value of the vehicle by adjusting the first longitudinal value of the vehicle to reduce, using an optimization method, a difference between the first road profile and a second road profile calculated based on the distance and the line of sight.

In some embodiments, the machine learning model is a first machine learning model. The road profile is a first road profile. The code further comprises code to cause the processor to determine the second longitudinal value of the vehicle by adjusting the first longitudinal value of the vehicle to reduce, using a second machine learning model, a difference between the first road profile and a second road profile calculated based on the distance and the line of sight.

In some embodiments, the object is a first object. The code further comprises code to cause the processor to: detect a second object using a sensor disposed with the vehicle and determine, using the road profile associated with the second longitudinal value of the vehicle and a line of sight through the sensor and a contact point where the second object contacts the road, a distance between the second object and the vehicle.

In some embodiments, the second object is located further away from the vehicle than the first object. The code to cause the processor to determine the distance between the second object and the vehicle does not include using stereo depth estimation via the stereo camera pair.

In some embodiments, a method, comprises calculating a road profile in a pre-defined area within a vicinity of a vehicle based on map data of the pre-defined area. The method also comprises receiving a first image and a second image from a stereo camera pair disposed with the vehicle. The method comprises determining a distance from an object detected in the first image to the vehicle based on disparity between the first image and the second image. The method comprises determining a longitudinal value of the vehicle, based on the distance and a line of sight through a camera from the stereo camera pair and a contact point where the object contacts a road associated with the road profile. The method comprises sending a signal representing the road profile associated with the longitudinal value to facilitate driving of a vehicle.

In some embodiments, the object is a first object. The method further comprises: detecting a second object using a sensor disposed with the vehicle. The method comprises determining, using the road profile associated with the longitudinal value of the vehicle and a line of sight through the sensor and a contact point where the second object contacts the road, a distance between the second object and the vehicle.

In some embodiments, the method further comprises identifying a bounding box representing the object. The method comprises determining, in an image coordinate system, coordinates of the contact point where the object contacts the road based on a bottom edge of the bounding box. The determining the longitudinal value is based on the coordinates of the contact point.

In some embodiments, the method further comprises converting the coordinates of the contact point in the image coordinate system to coordinates of the contact point in a global coordinate system. The determining the longitudinal value is based on the coordinates of the contact point in the global coordinate system.

In some embodiments, the contact point is a first contact point. The determining the longitudinal value includes determining the longitudinal value based on a triangulation of the line of sight, a line segment based one the distance between the contact point and a second contact point where the vehicle contacts the road, and a line segment based on a height of the vehicle.

In some embodiments, the longitudinal value of the vehicle is a first longitudinal value. The road profile is a first road profile. The method further includes determining the first longitudinal value of the vehicle by adjusting a second longitudinal value of the vehicle received from the map data to reduce a difference between the first road profile and a second road profile calculated based on the distance and the line of sight.

In some embodiments, a non-transitory processor-readable medium stores code representing instructions to be executed by the processor. The code comprises code to cause the processor to receive a first image and a second image from a stereo camera pair disposed with a vehicle. The code causes the processor to detect, using a machine learning model, an object based on the first image, the object located within a pre-defined area within a vicinity of the vehicle. The code causes the processor to determine a distance between the object and the vehicle based on disparity between the first image and the second image. The code causes the processor to determine a longitudinal value of the vehicle based on the distance and a height of the vehicle. The code causes the processor to send an instruction to facilitate driving of the vehicle based on a road profile associated with the longitudinal value.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational algorithm, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a processor; and
a memory operatively coupled to the processor, the memory storing instructions to cause the processor to:
calculate a road profile in a pre-defined area within a vicinity of a vehicle based on map data of the pre-defined area, the road profile associated with a road in the pre-defined area, the vehicle associated with a first longitudinal value determined from the map data;
receive a first image and a second image from a stereo camera pair disposed with the vehicle;
detect, using a machine learning model, an object based on the first image, the object located within the pre-defined area;
determine a distance between the object and the vehicle based on disparity between the first image and the second image;
determine a second longitudinal value of the vehicle, based on the distance and a line of sight through a camera from the stereo camera pair and a contact point where the object contacts the road; and
send an instruction to facilitate driving of the vehicle based on the second longitudinal value of the vehicle and the road profile.

2. The apparatus of claim 1, wherein:
the map data includes coordinate values of a plurality of points in the pre-defined area;
for each point from the plurality of points, the coordinate values includes at least one of a value in a first direction of a plane of the road, a value in a second direction of the plane of the road, a value in a third direction perpendicular to the plane of the road, or a pitch value.

3. The apparatus of claim 2, wherein:
the contact point is a first contact point; and
the instructions further comprises instructions to cause the processor to determine the second longitudinal value of the vehicle based on the coordinate values of the first contact point where the object contacts the road and the coordinate values of a second contact point where the vehicle contacts the road.

4. The apparatus of claim 1, wherein:
the instructions further comprises instructions to cause the processor to:
identify a bounding box representing the object; and
determine, in an image coordinate system, coordinates of the contact point where the object contacts the road based on a bottom edge of the bounding box; and
the instructions to cause the processor to determine the second longitudinal value of the vehicle includes instructions to cause the processor to determine based on the coordinates of the contact point.

5. The apparatus of claim 4, wherein:
the instructions further comprises instructions to cause the processor to convert the coordinates of the contact point in the image coordinate system to coordinates of the contact point in a global coordinate system; and
the instructions to cause the processor to determine the second longitudinal value of the vehicle is based on the coordinates of the contact point in the global coordinate system.

6. The apparatus of claim 1, wherein:
the instructions to cause the processor to detect the object includes code to cause the processor to detect a three-dimensional structure of the object; and
the instructions further comprises instructions to cause the processor to determine, in an image coordinate system, coordinates of the contact point where the object contacts the road based on the three-dimensional structure of the object.

7. The apparatus of claim 6, wherein:
the instructions further comprises instructions to cause the processor to convert the coordinates of the contact point in the image coordinate system to coordinates of the contact point in a global coordinate system; and
the instructions to cause the processor to determine the second longitudinal value of the vehicle based on the coordinates of the contact point in the global coordinate system.

8. The apparatus of claim 1, wherein:
the contact point is a first contact point; and
the instructions to cause the processor to determine the second longitudinal value includes instructions to cause the processor to determine the second longitudinal value based on a triangulation of the line of sight, a line segment between the first contact point and a second contact point where the vehicle contacts the road, and a line segment of a height of the vehicle.

9. The apparatus of claim 1, wherein:
the road profile is a first road profile; and
the instructions further comprises instructions to cause the processor to determine the second longitudinal value of the vehicle by adjusting the first longitudinal value of the vehicle to reduce a difference between the first road profile and a second road profile calculated based on the distance and the line of sight.

10. The apparatus of claim 1, wherein:
the road profile is a first road profile; and
the instructions further comprises instructions to cause the processor to determine the second longitudinal value of the vehicle by adjusting the first longitudinal value of the vehicle to reduce, using an optimization method, a difference between the first road profile and a second road profile calculated based on the distance and the line of sight.

11. The apparatus of claim 1, wherein:
the machine learning model is a first machine learning model;
the road profile is a first road profile; and
the instructions further comprises instructions to cause the processor to determine the second longitudinal value of the vehicle by adjusting the first longitudinal value of the vehicle to reduce, using a second machine learning model, a difference between the first road profile and a second road profile calculated based on the distance and the line of sight.

12. The apparatus of claim 1, wherein:
the object is a first object; and
the instructions further comprises instructions to cause the processor to:
detect a second object using a sensor disposed with the vehicle; and
determine, using the road profile associated with the second longitudinal value of the vehicle and a line of sight through the sensor and a contact point where the second object contacts the road, a distance between the second object and the vehicle.

13. The apparatus of claim 12, wherein:
the second object is located further away from the vehicle than the first object; and
the instructions to cause the processor to determine the distance between the second object and the vehicle does not include using stereo depth estimation via the stereo camera pair.

14. A method, comprising:
calculating a road profile in a pre-defined area within a vicinity of a vehicle based on map data of the pre-defined area;
receiving a first image and a second image from a stereo camera pair disposed with the vehicle;
determining a distance from an object detected in the first image to the vehicle based on disparity between the first image and the second image;
determining a longitudinal value of the vehicle, based on the distance and a line of sight through a camera from the stereo camera pair and a contact point where the object contacts a road associated with the road profile; and
sending a signal representing the road profile associated with the longitudinal value to facilitate driving of the vehicle.

15. The method of claim 14, wherein:
the object is a first object; and
the method further comprises:
detecting a second object using a sensor disposed with the vehicle;
determining, using the road profile associated with the longitudinal value of the vehicle and a line of sight through the sensor and a contact point where the second object contacts the road, a distance between the second object and the vehicle.

16. The method of claim 14, further comprising:
identifying a bounding box representing the object; and
determining, in an image coordinate system, coordinates of the contact point where the object contacts the road based on a bottom edge of the bounding box, the determining the longitudinal value is based on the coordinates of the contact point.

17. The method of claim 16, further comprising:
converting the coordinates of the contact point in the image coordinate system to coordinates of the contact point in a global coordinate system,
the determining the longitudinal value is based on the coordinates of the contact point in the global coordinate system.

18. The method of claim 14, wherein:
the contact point is a first contact point; and
the determining the longitudinal value includes determining the longitudinal value based on a triangulation of the line of sight, a line segment based one the distance between the contact point and a second contact point where the vehicle contacts the road, and a line segment based on a height of the vehicle.

19. The method of claim 14, wherein:
the longitudinal value of the vehicle is a first longitudinal value;
the road profile is a first road profile; and
the method further includes:
determining the first longitudinal value of the vehicle by adjusting a second longitudinal value of the vehicle received from the map data to reduce a difference between the first road profile and a second road profile calculated based on the distance and the line of sight.

20. A non-transitory processor-readable medium storing code representing instructions to be executed by the processor, the code comprising code to cause the processor to:
receive a first image and a second image from a stereo camera pair disposed with a vehicle;
detect, using a machine learning model, an object based on the first image, the object located within a predefined area within a vicinity of the vehicle;
determine a distance between the object and the vehicle based on disparity between the first image and the second image;
determine a longitudinal value of the vehicle based on the distance and a height of the vehicle; and
send an instruction to facilitate driving of the vehicle based on a road profile associated with the longitudinal value.

* * * * *